United States Patent [19]

Georgiev et al.

[11] 4,254,913

[45] Mar. 10, 1981

[54] RETRACTABLE SPRAY HEAD FOR IRRIGATION SYSTEM

[75] Inventors: Vesselin Y. Georgiev; Vladimir S. Mednikarov, both of Sofia, Bulgaria

[73] Assignee: Institute Po Mechanika I Biomechanika, Sofia, Bulgaria

[21] Appl. No.: 29,476

[22] Filed: Apr. 12, 1979

[30] Foreign Application Priority Data

Apr. 13, 1978 [BG] Bulgaria .................................. 39396

[51] Int. Cl.[3] ......................... F16K 21/00; B05B 15/10

[52] U.S. Cl. ...................................... 239/204; 137/467

[58] Field of Search ............... 239/203, 204, 205, 206; 137/467

[56] References Cited

U.S. PATENT DOCUMENTS

| | | | |
|---|---|---|---|
| 2,939,249 | 6/1960 | Siebenthal | 239/205 X |
| 3,263,929 | 8/1966 | Seablom | 239/204 |
| 3,331,292 | 7/1967 | Seablom | 239/203 X |
| 3,637,139 | 1/1972 | Felix | 239/206 |
| 3,752,403 | 8/1973 | Van Diest | 239/204 |

*Primary Examiner*—Arnold Rosenthal
*Attorney, Agent, or Firm*—Karl F. Ross

[57] ABSTRACT

A riser tube rigid with a piston head is vertically reciprocable in a cylindrical housing to which water under pressure may be admitted from the bottom to raise the tube into an elevated position, in which its tip extends above the ground, or through a lateral port near the top of the housing to lower the tube into a retracted position below ground. The piston head has a peripheral groove which communicates with the bore of the tube and, in the extended position, registers with an upper set of holes in the housing wall which are connected through a stationary external sleeve with a lower set of holes, lying then beneath the piston head, whereby water from a distributing pipe of an irrigation system can enter the riser tube after having elevated same into that position.

4 Claims, 2 Drawing Figures

RETRACTABLE SPRAY HEAD FOR IRRIGATION SYSTEM

Our present invention relates to a retractable spray head for an irrigation system used on farmland. Such a system has been shown, for example, in our copending application Ser. No. 904,922 filed May 11, 1978, now U.S. Pat. No. 4,201,340.

Conventional spray heads of the retractable type comprise a cylindrical housing, buried below ground, in which a piston is vertically reciprocable, the piston including a riser tube which in an extended position projects above ground while being withdrawn below the surface in a retracted position. Water under pressure is used for alternately elevating and lowering the piston; the water admitted to the bottom of the cylinder for the upward stroke enters the riser tube for discharge in the form of a spray in the extended position thereof. Means must be provided for preventing such a discharge while the tube rises or descends; a known system uses for this purpose a gate mechanism including a movable sleeve. Such a mechanism, however, has the drawback of forming an imperfect seal when the water is polluted with mechanical impurities or is enriched with mineralic fertilizers.

Thus, the object of our invention is to provide a retractable spray head obviating this drawback.

In accordance with our present invention, an upright cylinder forms part of a housing which also includes a base, the latter being provided with a chamber which opens into the bottom of the cylinder and communicates with first conduit means of the irrigation system. A lateral port near the top of the cylinder communicates with second conduit means of the irrigation system, the cylinder further having an upper hole and a lower hole beneath the level of that port. A piston vertically reciprocable in the cylinder comprises a piston head at the lower end of a riser tube, the piston head having a peripheral groove communicating with that lower end. In the extended piston position, in which the riser tube projects above ground, the lateral port of the cylinder lies just above an upper surface of the piston head while the aforementioned upper hole registers with the peripheral groove and the lower hole lies beneath the level of an undersurface of the piston head. The upper and lower holes communicate with each other through a fixed external connection on the cylinder, such as a sleeve centered on the cylinder axis, whereby water entering the chamber in the housing base from the first conduit means—after elevating the piston into its extended position—passes into the riser tube via the lower hole of the cylinder, the external connection, the upper hole and the peripheral groove of the piston head for irrigating a surrounding area. Upon withdrawal of the piston into its retracted position by water entering the lateral port of the cylinder from the second conduit means, this passage is blocked.

Figure 1:
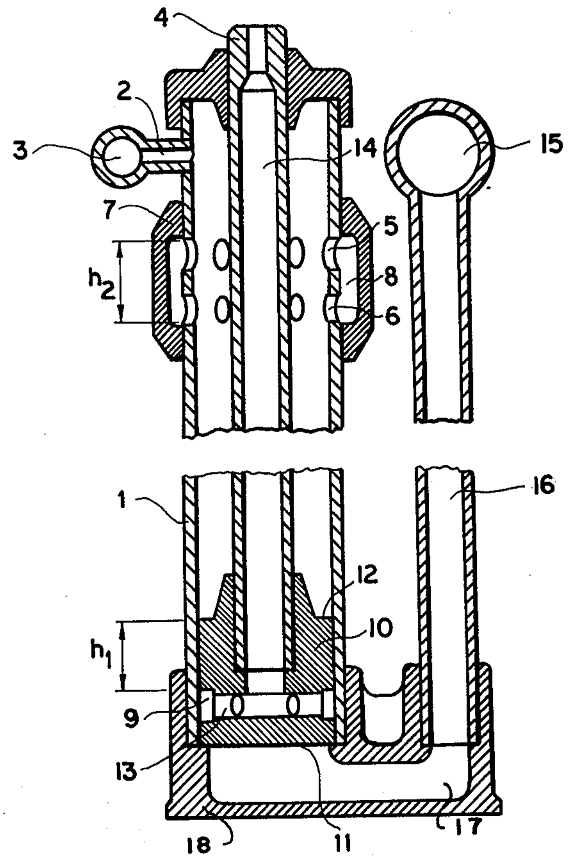
Figure 2:
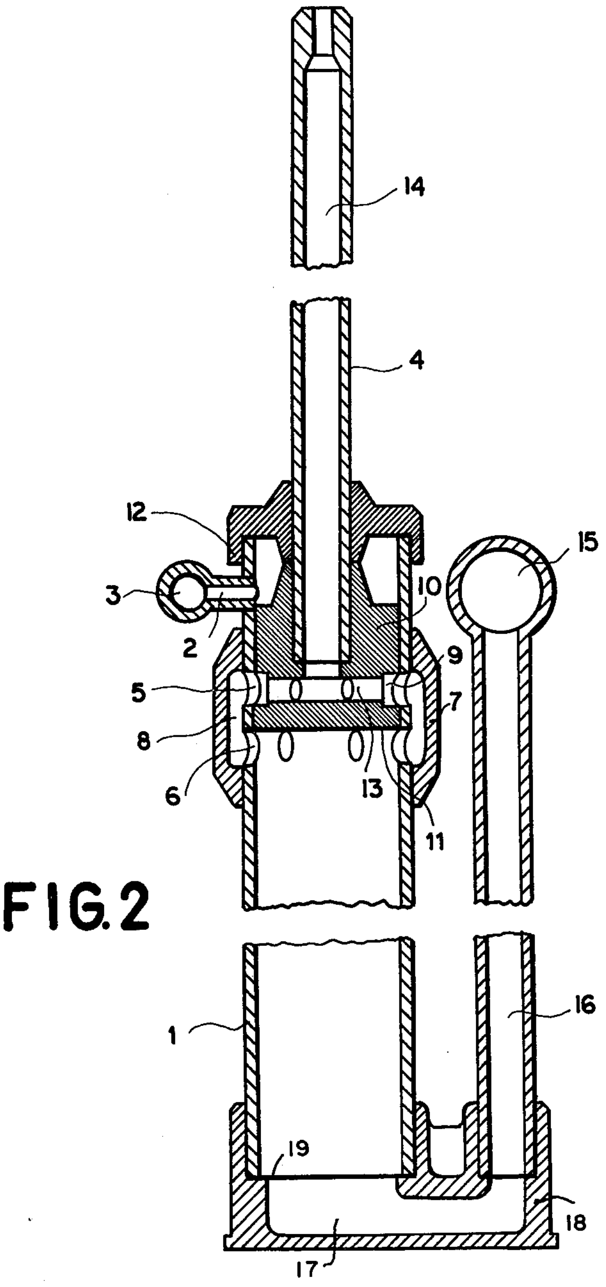

For a better understanding of the invention, reference should be made to the accompanying drawing in which:

FIG. 1 is an axial sectional view of a spray head according to our invention in a retracted position; and FIG. 2 is a view similar to FIG. 1, showing the spray head in an extended position.

In the drawing we have shown a cylinder 1 of a spray head according to our invention. provided with an entrance port 2 communicating with a water-supply pipe 3 of an irrigation system for the retraction of a riser tube 4. Below port 2 there are two sets of peripherally spaced radial holes 5 and 6, on an upper and a lower level, in a zone surrounded by a fixed annular sleeve 7 which is centered on the cylinder axis and forms an external ring chamber 8 interconnecting the two sets of peripherally spaced holes. Tube 4 has a piston head 10 formed with a peripheral groove 9 whose distance $h_1$ from an upper surface 12 of piston head 10 is greater than the height $h_2$ of the zone occupied by holes 5 and 6. Groove 9 communicates via a set of radial holes 13 with the axial bore 14 of tube 4. Another supply pipe 15 communicates through a conduit 16 with a chamber 17 in a base 18 of a housing formed in part by cylinder 1.

The spray head according to our invention operates as follows: With piston 4, 10 retracted as shown in FIG. 1, water is delivered under pressure by the water-distributing system to pipe 15 from which the water pressure is transmitted through conduit 16 and chamber 17 to the underside 11 of piston head 10, which starts to move upward whereby the tube 4 is raised above the ground surface. At the same time any water present in the space above the piston head is forced through port 2 into the supply pipe 3 which at this point is vented to the atmosphere. When piston head 10 reaches its top position shown in FIG. 2, holes 5 register with the annular groove 9 and the water flows through the holes 6, the ring chamber 8, the holes 5, the annular groove 9 and the radial holes 13 into the bore 14 of the riser tube 4, thus starting the process of irrigation.

After the termination of irrigation, the water-distributing system including pipe 15 is switched-off and is vented to the atmosphere while the water is admitted under pressure to supply pipe 3. The water enters through port 2 into the space above the piston and begins to retract the piston 4, 10. Since the holes 5 are cleared by the upper surface 12 of piston head 10 only after the annular groove 9 has descended past the holes 6, no water is flowing out through bore 14 at this stage. Water still present in the space below the piston is forced through conduit 16 to the vented distributing pipe 15. The retraction of tube 4 is stopped when piston head 10 reaches its bottom position, i.e. when piston head 10 comes to rest on a seat 19 formed by base 18.

What we claim is:

1. A spray head for an irrigation system having first and second conduit means alternately supplied with water under pressure, comprising:

an underground housing including an upright cylinder and a base forming a chamber which communicates with said first conduit means and opens into the bottom of said cylinder;

a piston reciprocable in said cylinder between a retracted and an extended position, said piston including a piston head on a lower end of a riser tube whose open upper end projects above ground in said extended position while being withdrawn in said retracted position, said piston head having a peripheral groove communicating with the lower end of said tube, said cylinder being provided near its top with a lateral port which communicates with said second conduit means and lies just above an upper surface of said piston head in said extended position of said piston, said cylinder further having at least one upper hole and at least one lower hole beneath the level of said port, said upper hole registering with said groove and said lower hole lying beneath the level of an undersurface of said piston head in said extended position; and a fixed external connection between said upper and lower holes on said cylinder whereby water entering said chamber from said first conduit means, after elevating said piston into its extended position, passes into said tube via said lower hole, said connection, said upper hole and said groove for irrigating a surrounding area, said piston being withdrawable into its retracted position by water entering said port from said second conduit means.

2. A spray head as defined in claim 1 wherein said upper hole and said lower hole are part of two sets of holes distributed about the cylinder axis, said connection comprising a sleeve centered on said axis.

3. A spray head as defined in claim 1 or 2 wherein said upper and lower holes lie in a zone of said cylinder whose axial height is less than the distance of said groove from said upper surface of said piston head.

4. A spray head as defined in claim 1 or 2 wherein said base forms a seat for said piston head in said retracted position.

* * * * *